United States Patent
Boulanger et al.

(10) Patent No.: US 9,211,610 B2
(45) Date of Patent: Dec. 15, 2015

(54) DEVICE FOR CUTTING A STRUCTURE INCLUDING WIRE-LIKE NANOSCALE OBJECTS, AND RELATED METHOD

(75) Inventors: Pascal Boulanger, Eguilles (FR); Olivier Sublemontier, Fontenay aux Roses (FR); Olivier Gobert, Gallardon (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 314 days.

(21) Appl. No.: 13/991,733

(22) PCT Filed: Dec. 14, 2011

(86) PCT No.: PCT/EP2011/072678
§ 371 (c)(1),
(2), (4) Date: Jun. 5, 2013

(87) PCT Pub. No.: WO2012/080291
PCT Pub. Date: Jun. 21, 2012

(65) Prior Publication Data
US 2013/0256280 A1  Oct. 3, 2013

(30) Foreign Application Priority Data
Dec. 16, 2010  (FR) ..................... 10 60628

(51) Int. Cl.
*B23K 26/12* (2014.01)
*B23K 26/36* (2014.01)
*B23K 26/40* (2014.01)
*B23K 26/06* (2014.01)

(52) U.S. Cl.
CPC ......... *B23K 26/4025* (2013.01); *B23K 26/0635* (2013.01); *B23K 26/12* (2013.01); *B23K 26/127* (2013.01); *B23K 26/405* (2013.01); *B23K 26/36* (2013.01)

(58) Field of Classification Search
CPC .... B23K 26/12; B23K 26/40; B23K 26/4025; B23K 26/36
USPC ............. 219/121.61, 121.67–121.69, 121.72; 250/492.1
See application file for complete search history.

(56) References Cited

U.S. PATENT DOCUMENTS

| | | | |
|---|---|---|---|
| 5,736,709 A | 4/1998 | Neiheisel | |
| 5,948,172 A | 9/1999 | Neiheisel | |
| 8,846,551 B2 * | 9/2014 | Gupta et al. | 438/795 |
| 2012/0224944 A1 | 9/2012 | Boulanger et al. | |
| 2012/0228839 A1 | 9/2012 | Boulanger et al. | |
| 2013/0108865 A1 | 5/2013 | Boulanger et al. | |

FOREIGN PATENT DOCUMENTS

| | | |
|---|---|---|
| WO | 2007 012215 | 2/2007 |
| WO | 2007 149109 | 12/2007 |
| WO | 2008 033135 | 3/2008 |

OTHER PUBLICATIONS

International Search Report Issued Mar. 26, 2012 in PCT/EP11/072678 Filed Dec. 14, 2011.

* cited by examiner

*Primary Examiner* — Samuel M Heinrich
(74) *Attorney, Agent, or Firm* — Oblon, McClelland, Maier & Neustadt, L.L.P.

(57) ABSTRACT

A device for cutting a structure including nanotubes, including: a mechanism to polarize linearly laser pulses emitted in a direction of the structure, wherein a duration of the laser pulses is roughly between 1 femtosecond and 300 femtoseconds; and a mechanism to focus the linearly polarized laser pulses on the structure.

13 Claims, 5 Drawing Sheets

DEVICE FOR CUTTING A STRUCTURE INCLUDING WIRE-LIKE NANOSCALE OBJECTS, AND RELATED METHOD

TECHNICAL FIELD AND PRIOR ART

The invention relates to a device for cutting a structure including wire-like nanoscale objects. The invention also relates to a cutting method implemented by the device of the invention.

The term "wire-like nanoscale objects" means, in particular, nanotubes or nanowires.

The expression "a structure including wire-like nanoscale objects" means, for example, a composite including nanotubes in the form of a carpet of nanotubes encased in polymer, or a structure consisting solely of a carpet of nanotubes.

The expression "cutting a structure including wire-like nanoscale objects" means, for example, the operation to separate a carpet of nanotubes from the substrate to which it adheres, thinning of a carpet of nanotubes in order, for example, to form several separate carpets of nanotubes from a single carpet of nanotubes, or again opening the heads of the nanotubes of a carpet of nanotubes.

A carpet of carbon nanotubes may be produced, for example, by a suitable synthesis on a substrate. The carpet of nanotubes must then be separated from the substrate.

According to the known art, separation, or delamination, of a carpet of nanotubes from the substrate to which the carpet is adhering is difficult to accomplish.

In the case of thin carpets, for example carpets which are less than 100 μm thin, separation proves almost impossible. The patent application WO 2007/149109 A2 thus discloses the delamination of a carpet of nanotubes by the microelectronics technique known by the name "lift-off". The carpet of nanotubes is delaminated in pieces using a nanosecond laser (i.e. a laser which emits pulses of a width of several nanoseconds). The disadvantages of this delamination are not only that the carpet cannot be delaminated in its entirety, but also that is not possible to retain the nanotubes' alignment when the pieces have been delaminated. The invention does not have these disadvantages.

As regards the thinning of the carpet of nanotubes according to the prior art, it is accomplished by mechanical polishing, chemical mechanical polishing, chemical attack or again plasma attack. Each of these thinning methods has many disadvantages. The disadvantages of thinning by mechanical polishing are a substantial loss of matter, excessively long duration of the intervention (the final abrasion speed is several tens of nanometers per minute, and depends on the material encasing the nanotubes), a limitation of the surfaces able to be treated (wafers measuring a maximum of 12 inches), and the impossibility of applying continuous thinning. The disadvantages of thinning by chemical mechanical polishing are almost identical to those of mechanical polishing, except for the duration of the action, which is shorter.

An additional disadvantage is, however, the use of chemicals. The disadvantages of chemical attack are, in addition to the use of chemicals, imprecise cutting and damage to the nanotubes. As regards plasma attack, its disadvantages are mainly the speed of the intervention (the speed of abrasion is some tens of nanometers per minute, and depends on the material encasing the nanotubes), and damage to the nanotubes.

The thinning method of the invention does not have these disadvantages.

ACCOUNT OF THE INVENTION

The invention relates to a device for cutting a structure including wire-like nanoscale objects roughly aligned in the same axis, characterised in that it includes:
- a laser source able to emit a laser beam in the form of laser pulses of a width of between 1 femtosecond and 300 femtoseconds;
- means able to adjust the energy of each laser pulse emitted to between 0.1 μJ and 10 mJ;
- means able to set a repetition frequency of the emitted laser pulses to between 10 Hz and 10 kHz;
- means able to polarise the emitted laser pulses linearly;
- means able to focus the linearly polarised laser pulses on the wire-like nanoscale objects of the structure, and
- a containment enclosure which includes:
  a) an observation port which is transparent to the wavelength of the laser pulses,
  b) a bracket on which the structure to be cut is positioned,
  c) means able to move the bracket so as to cause a relative displacement of the laser beam relative to the wire-like nanoscale objects of the structure, and
  d) means to remove from the enclosure debris resulting from the cutting.

The term "means able to focus" the laser pulses means optical means able to concentrate the maximum energy of laser pulses which traverse them either in a single point (in this case called "the focal point"), or on a straight line segment perpendicular to the direction of propagation of the laser pulses (this is the case with a laser sheet), or on a line parallel to the direction of propagation of the laser pulses (this is the case with an axicon).

The invention also relates to a method for cutting a structure including wire-like nanoscale objects which is implemented by the cutting device of the invention.

As mentioned above, the expression "cutting a structure including wire-like nanoscale objects" is understood to mean, for example, the operation to separate a carpet of nanotubes from the substrate to which it adheres, thinning of a carpet of nanotubes in order, for example, to form several separate carpets of nanotubes from a single carpet of nanotubes, or again opening the heads of the nanotubes of a carpet of nanotubes.

The cutting method of the invention advantageously leads, for example, to the formation of carpets of very thin nanotubes (typically 100 μm, or thinner).

In the remainder of the description the method for cutting a wire-like nanoscale object of the invention relates to nanotube cutting. More generally, however, the cutting method of the invention relates to cutting any type of wire-like nanoscale object such as, for example:
- inorganic nanotubes, notably those chosen from the group constituted by imogolite nanotubes, boron nitride nanotubes (BN), zinc oxide nanotubes (ZnO), gallium nitride nanotubes (GaN), silicon nitride nanotubes (Si3N4), tungsten disulfide nanotubes (WS2), molybdenum disulfide nanotubes (MoS2), tungsten selenide nanotubes (WSe2), molybdenum selenide nanotubes (MoSe2), titanium dioxide nanotubes (TiO2) or molybdenum trioxide nanotubes (MoO3), or one of their blends;
- organic nanotubes, notably chosen from the group constituted by carbon nanotubes, peptide nanotubes, cyclic peptide nanotubes, transmembrane molecule nanotubes, crown ether nanotubes, porphyrin nanotubes, aquaporin nanotubes, gramicidin nanotubes, polymer nanotubes, nanotubes formed by self-assembly of organic molecules, or one of their blends;

nanowires, notably chosen from the group constituted by gold (Au) nanowires, silver (Ag) nanowires, nickel (Ni) nanowires, platinum (Pt) nanowires, silicon (Si) nanowires, gallium nitride (GaN) nanowires, indium phosphide (InP) nanowires, silicon dioxide (SiO2) nanowires, titanium dioxide (T102) nanowires, zinc oxide (ZnO) nanowires, 1,5-diaminoanthraquinone nanowires, DNA (DeoxyriboNucleic Acid) nanowires, nanowires consisting of nanotubes, or one of their blends.

When the invention relates to carbon nanotubes, the carbon nanotubes maybe single-wall nanotubes, double-wall nanotubes, or multi-wall nanotubes. The density of the nanotubes is between, for example, $10^4$ and $10^{13}$ nanotubes/cm2 and, more particularly, between $10^8$ and $10^{11}$ nanotubes/cm2. The internal diameter of the nanotubes is, for example, between 0.5 nm and 100 nm (more particularly between 0.5 nm and 10 nm) and the external diameter is, for example, between 0.5 nm and 500 nm (more particularly between 1 nm and 100 nm).

BRIEF DESCRIPTION OF THE FIGURES

Other characteristics and advantages of the invention will appear on reading the embodiments given in reference to the attached figures, among which.

In all the figures the same references designate the same elements.

DETAILED ACCOUNT OF PARTICULAR EMBODIMENTS OF THE INVENTION

Figure 1:
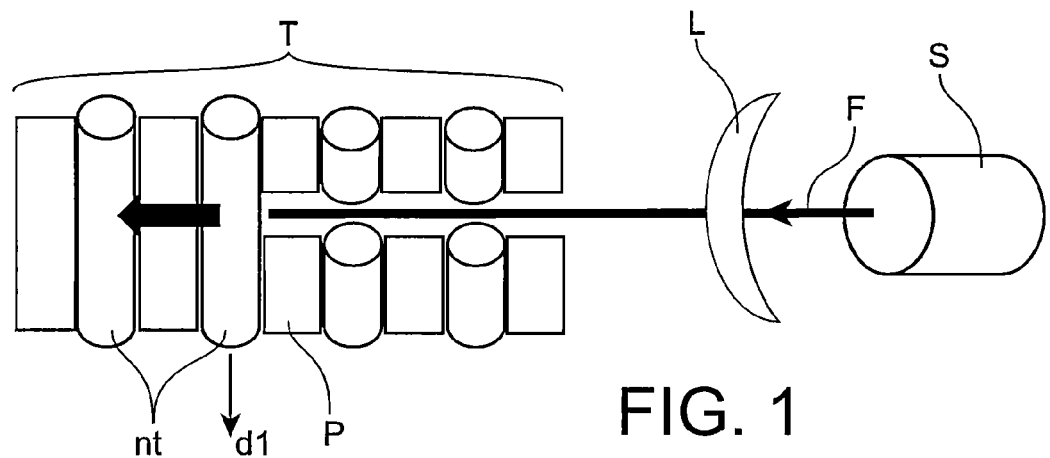
FIG. 1 represents, symbolically, the act of cutting a carpet of nanotubes by transverse attack according to the method of the invention.

FIG. 1 represents, symbolically, the act of cutting a carpet of nanotubes by transverse attack according to the invention.

A beam F of laser pulses emitted by a laser source S is focused, by a focusing device L, sideways on a carpet T of nanotubes nt. Nanotubes nt are encased in a polymer P which helps to hold the nanotubes. More generally, however, the invention also relates, in a very advantageous manner, to the case in which the nanotubes are not encased in polymer, but in which only the Van der Waals forces between the nanotubes help to hold the carpet. Beam F attacks the carpet from the side.

The carpet moves linearly in a direction d1 which is roughly perpendicular to the axis of propagation of the pulses of beam F. Direction d1 may be unidirectional, as represented in FIG. 1, or bidirectional (to and fro movement). By this means the laser pulses gradually penetrate the carpet of nanotubes, such that two carpets of nanotubes are finally produced from initial carpet T.

Initial carpet T is, for example, one or several millimeters thick, and it is, for example, between one centimeter and several tens of centimeters long. The cutting operation may be repeated several times, such that it is possible to form several carpets of nanotubes, the lengths of which are identical to that of initial carpet T, and the thickness of which may attain an advantageously very low value, for example less than 100 µm, with an accuracy of plus or minus 5 µm.

In one particular embodiment of the invention several carpets of nanotubes may be produced simultaneously using several parallel laser beams emitted from one or more laser sources. As will be stipulated in due course (cf. FIG. 6), to accomplish a cut as mentioned above the laser pulses are characterised, preferentially, by the following magnitudes:
- a duration of between 1 and 300 femtoseconds;
- any wavelength compatible with the generation of pulses having the desired duration, for example 800 nm;
- a repetition frequency of between 10 Hz and 100 kHz;
- a linear polarisation of the pulses of the laser beam;
- a energy of each pulse of between 0.1 µJ and 10 ml;
- a diameter of the laser beam of between 0.1 cm and several centimeters.

Figure 2:
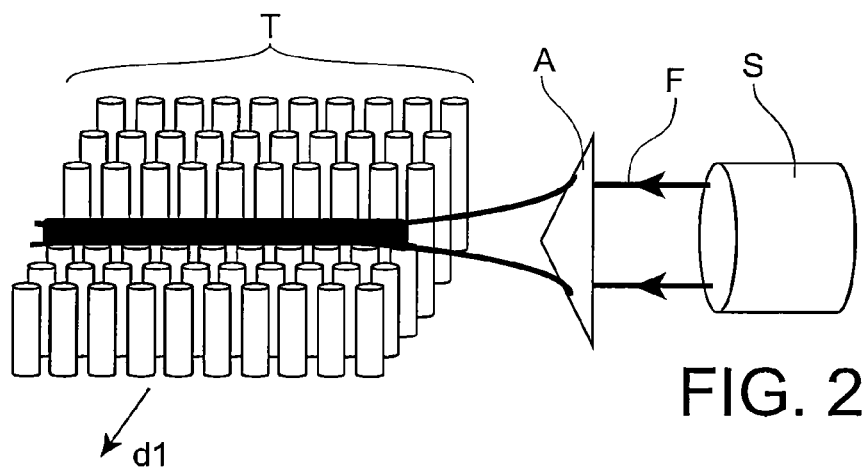
FIG. 2 represents, symbolically, the act of cutting a carpet of nanotubes by transverse attack with a large depth of field, according to the method of the invention.

FIG. 2 represents, symbolically, the act of cutting a carpet of nanotubes with a large depth of field, according to the method of the invention.

The pulses of laser beam F are in this case focused using a device able to focus over a distance of several centimeters in the axis of the laser beam, for example a lens of conical type or an axicon A. To accomplish the cut, carpet T of nanotubes is moved relative to beam F in a direction d1 roughly perpendicular to the axis of propagation of beam F. Cutting the carpet of nanotubes also leads, in this case, to the formation of two separate carpets. For the sake of clarity, FIG. 2 represents only the action of the laser beam, in its sideways effect on the carpet of nanotubes, and not the two carpets of nanotubes which are formed.

Figure 3:
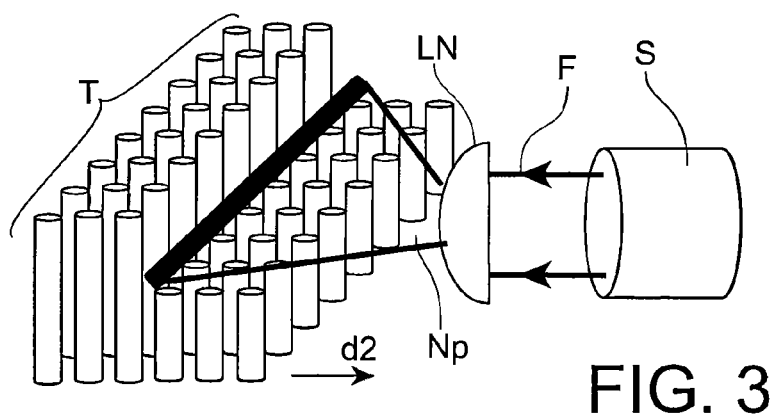
FIG. 3 represents, symbolically, the act of cutting a carpet of nanotubes using a laser sheet according to the method of the invention.

FIG. 3 represents, symbolically, the act of cutting a carpet of nanotubes using a laser sheet according to the method of the invention.

The pulses of laser beam F are in this case focused using a device able to focus over a distance of several centimeters perpendicular to the axis of the laser beam, for example a lens of cylindrical type LN. Laser beam F is then broadened in the form of a laser sheet Np. To accomplish the cut, the carpet of nanotubes is moved, towards laser source S, in a direction d2 which is roughly parallel to laser sheet Np, and perpendicular to the thickness dimension of the carpet of nanotubes.

Cutting the carpet of nanotubes leads, once again, to the formation of two separate carpets. For the sake of clarity, FIG. 3 represents only the action of the laser beam, in its sideways effect on the carpet of nanotubes, and not the two carpets of nanotubes which are formed.

Figure 4:
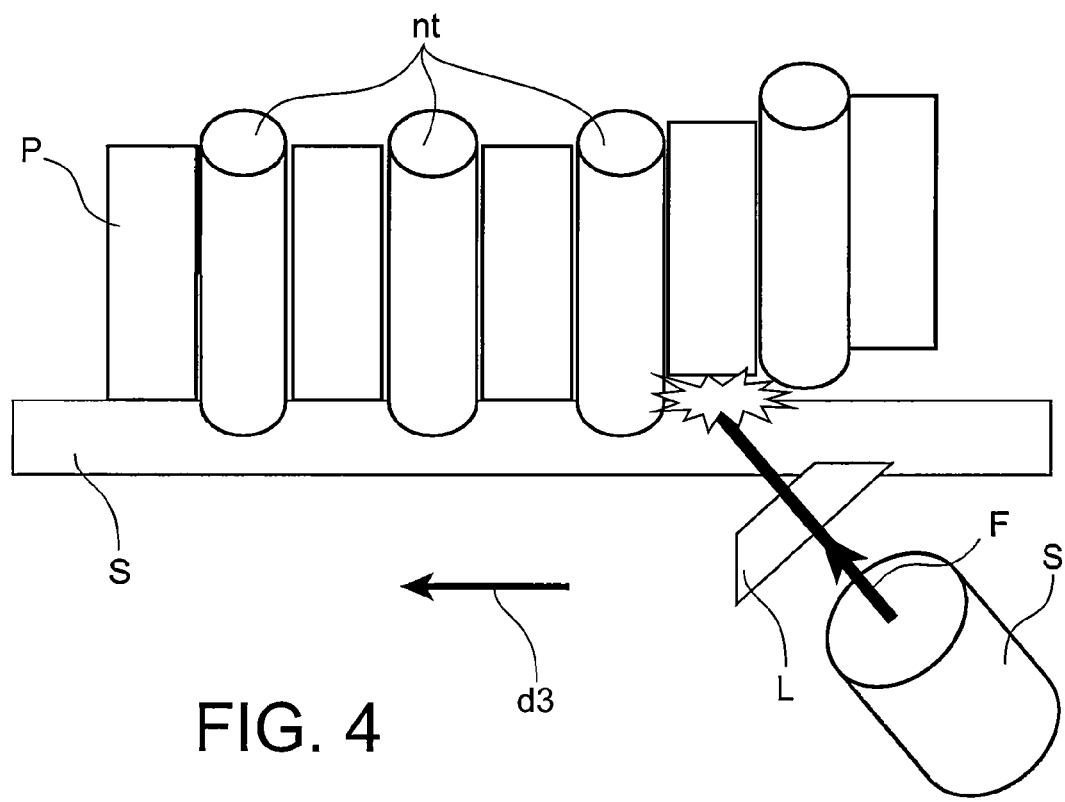
FIG. 4 represents, symbolically, the act of delaminating a carpet of nanotubes according to the method of the invention.

FIG. 4 represents an operation to cut a composite consisting of a carpet of nanotubes and a substrate Su on which the carpet is formed. Cutting the composite causes the carpet of nanotubes to be lifted off substrate Su using a beam F of laser pulses. The characteristics of the laser pulses are, for example, within the range of characteristics mentioned above with reference to FIG. 1.

Figure 5:
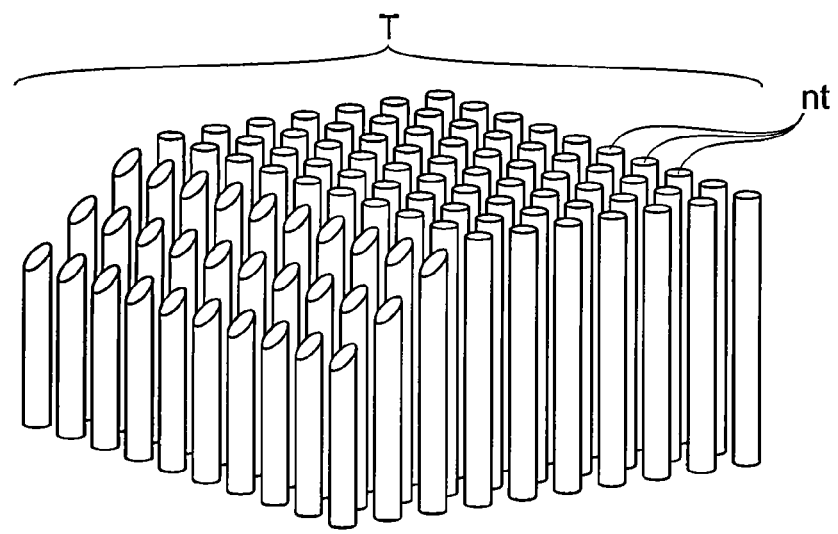
FIG. 5 represents a carpet of nanotubes obtained following an act of cutting the nanotubes on the bias according to the method of the invention.

FIG. 5 represents a carpet of nanotubes a portion of which is machined on the bias according to the method of the invention. To obtain such a result the laser beam attacks the carpet of nanotubes on the bias, with the advantageous that it can be any incident angle.

Figure 6:
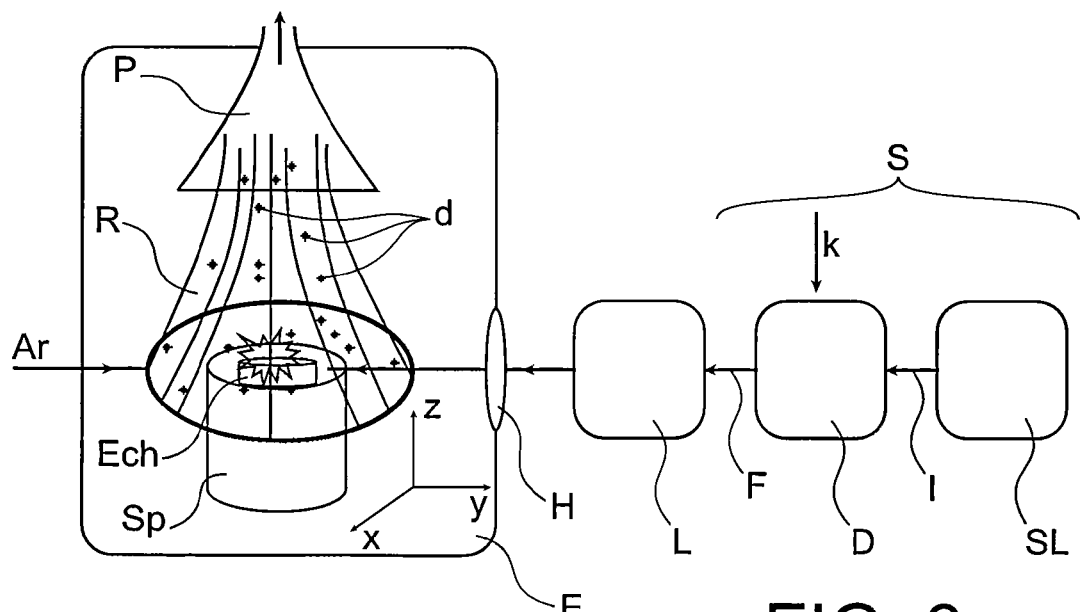
FIG. 6 represents the outline diagram of a device for cutting carpets of nanotubes able to implement the method of the invention.

FIG. 6 represents the outline diagram of a device able to implement the method of the invention.

The device includes a source SL of laser pulses I, a device D able to shape laser pulses I as a beam of pulses F, a device L for focusing beam F and a containment enclosure E in which sample Ech to be cut is placed on a support which can be slid and/or rotated within the enclosure.

The duration of laser pulses I emitted by laser source SL is, for example, several tens of femtoseconds. More generally, the duration of the laser pulses is between 1 and 300 femtoseconds. As will be made clearer below with reference to FIG. 8, device D for shaping the laser pulses includes means able to adjust the energy of the laser pulses, means able to adjust the repetition frequency of the laser pulses, and means able to polarise the laser pulses linearly. The linearly polarised laser pulses generally have a component in the axis of the nanotubes and a component in an axis perpendicular to the axis of the nanotubes. Polarisation of the laser pulses may depend on the chirality of the nanotubes. The linear polarisation of the nanotubes is preferentially parallel to the axis of the nanotubes or perpendicular to the axis of the nanotubes. The shaped pulses delivered by device D are then focused by focusing device L. Focusing device L consists, for example, of one or more lenses or one or more axicons. The diameter of the focal spot of the beam of pulses is determined by the choice of the focusing optics. This diameter is typically between 10 µm and 500 µm, and preferably between 20 µm and 80 µm. The Rayleigh length is also determined by the choice of focusing optics.

It is typically between 2.5 mm and 50 cm. The axicon is chosen, for example, to obtain large Rayleigh lengths. The fluence of the laser beam which is desired in the sample is obtained by the choice of the energy of each laser pulse, combined with the choice of diameter of the focal spot in the sample. The fluence is typically, depending on the desired use, between 1 µJ/cm2 and 20 J/cm2. As a non-restrictive example, fluence is 3 J/cm2 for a lens L of focal distance equal to 30 cm, an incident beam 7 mm in diameter, and pulses of 100 µJ per pulse. In this case the Rayleigh length is 1 cm. Sample Ech placed in enclosure E may be slid and/or rotated in the space of enclosure E referenced relative to a direct trihedron (x, y, z), where plane z=0 is a plane parallel to the surface of the composite. An observation port H transparent to the wavelength of beam F is formed in the wall of enclosure E in order to allow the focused pulses to pass through, which then reach the sample. Pressurised argon Ar is introduced into enclosure E in the form of a curtain R which is evacuated, through the top of the enclosure, using pumping device P. The operation to cut the structure is accompanied by the formation of debris d. Debris d is conveyed by argon stream R and evacuated outside enclosure E using the argon curtain.

Figure 7:
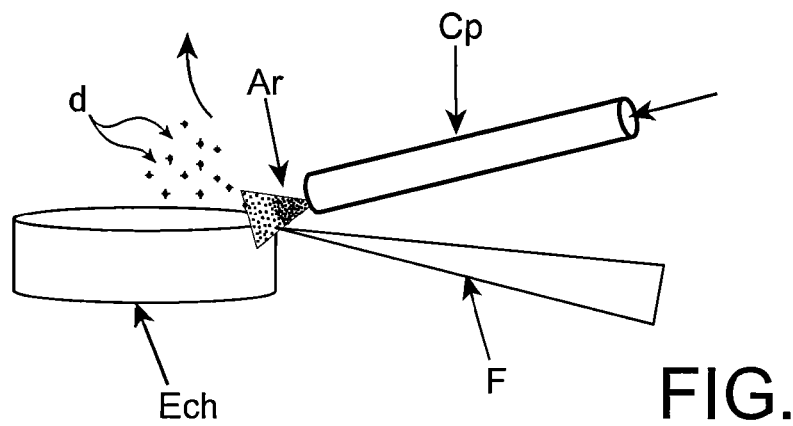
FIG. 7 represents one particular embodiment of an element of the device represented in FIG. 6.

FIG. 7 represents a possible addition to the device represented in FIG. 6.

The particular element of FIG. 7 is a system intended to prevent the deposition of debris on the sample. In this case the argon arrives as close as possible to the sample, using a capillary Cp. The "high" value of the argon flow rate enables the deposition of the debris ejected during the cutting on the cut portion of the carpet to be greatly reduced. Debris d which is formed is evacuated from the enclosure with the gas (pumping system).

Figure 8:
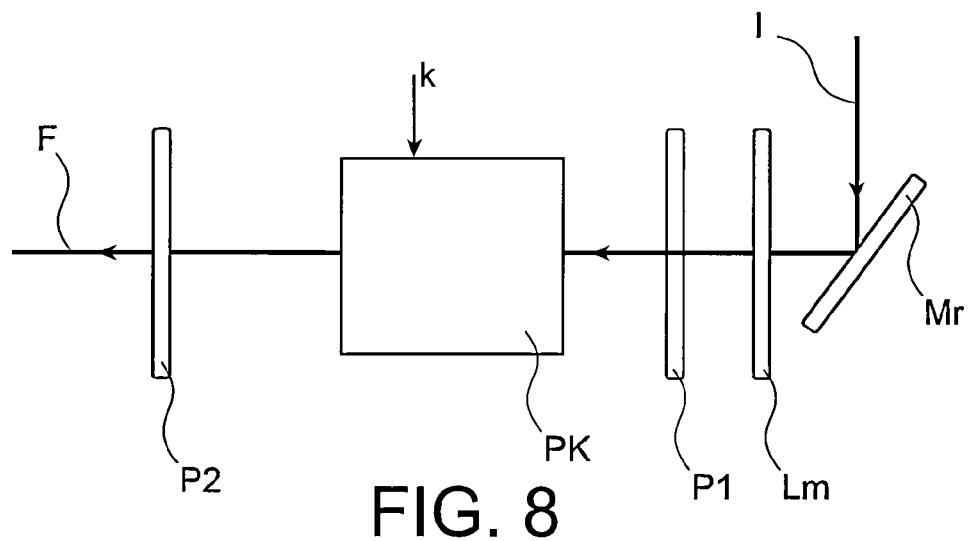
FIG. 8 represents an element constituting the device of FIG. 6, according to the preferential embodiment of the invention.

FIG. 8 represents a detailed view of one preferential embodiment of device D able to shape the laser pulses delivered by source SL. Device D includes means (Lm, P1) able to adjust the energy of the laser pulses, means (PK) able to adjust the repetition frequency of the laser pulses and means (P2) able to polarise the laser pulses linearly. In one preferential embodiment, device D also includes a device able to align the laser pulses in the desired direction, for example a mirror Mr.

The means able to adjust the energy of the laser pulses include, for example, a half-wave plate Lm and a first linear polariser P1. The means able to adjust the repetition frequency consist, for example, of polarisers and of a Pockels cell PK controlled by a control signal k. The means to polarise the pulses linearly consist, for example, of a polariser P2. Half-wave plate Lm and polariser P1 enable the energy of the laser pulses to be adjusted such that the energy of each laser pulse is between 0.1 µl and 10 ml (preferentially between 1 µl and 100 µA.

The laser pulses of which the energy is adjusted then enter Pockels cell PK, which enables their repetition frequency to be adjusted to the value desired for the chosen intervention. The repetition frequency of pulses I which enter the Pockels cell is roughly between 1 kHz and 10 kHz. The repetition frequency of the pulses which leave the Pockels cell is preferentially adjusted to a value between 10 Hz and the repetition frequency of the incoming pulses. The repetition frequency of the laser pulses is adjusted according to the desired cutting speed. The higher the repetition frequency the faster the cutting is accomplished. The repetition frequency may, however, have to be reduced to be adapted to the speed of movement of the sample relative to the laser beam. The reason for this reduction of repetition frequency is the need to limit the local overlap of the laser pulses on the sample, which leads to deleterious thermal effects. As a non-restrictive example, the speed of movement of a sample may be between 100 microns/s and 1.5 mm/s.

Figure 9:
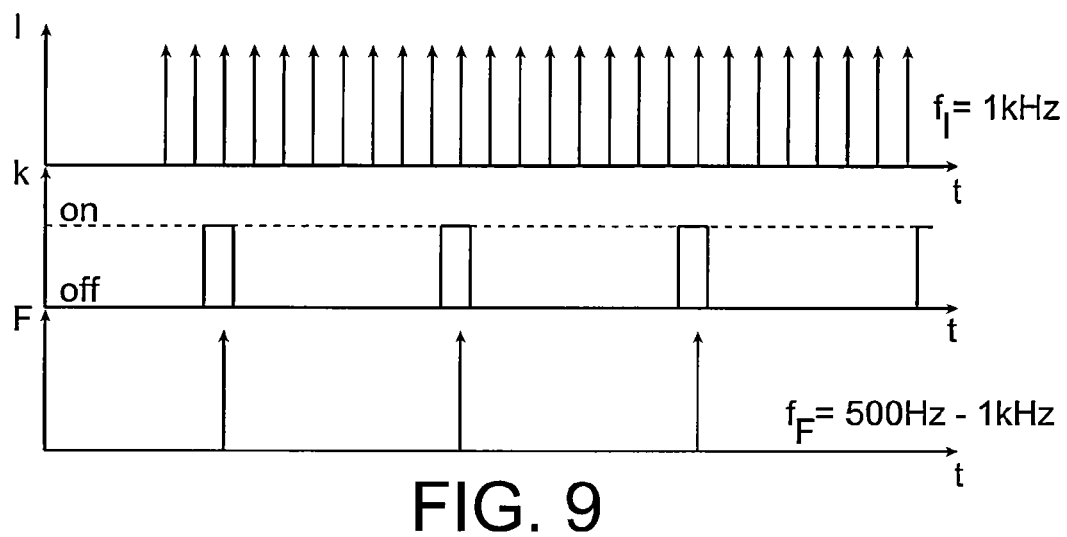
FIG. 9 illustrates the formation of laser pulse signals which are used to implement the cutting method of the invention.

FIG. 9 illustrates the process of formation of the pulses of beam F from pulses I emitted by the laser source. Three different signals are represented in FIG. 9, namely:

pulses I which are emitted by the laser source with a repetition frequency fl for example equal to 1 kHz;

control signal k of the Pockels cell, which allows or refuses pulse transfer according to an "ON" state or an "OFF" state;

beam F of the pulses which are delivered at the output of polariser P2, repetition frequency fF of which is, for example, between 500 Hz and 1 kHz.

Table 1 below summarises, as a non-restrictive example, a number of characteristics of the pulses of laser beam F (fluence and repetition frequency) according to the desired interventions.

TABLE 1

| Fluence (mJ/cm$^2$) | Frequency $f_F$ of repetition of the pulses | Intervention |
| --- | --- | --- |
| >50 | 10 kHz | Coarse cutting of a composite or carpet of nanotubes |
| 10 to 50 | 10 Hz | Precise cutting of a composite or carpet of nanotubes |

TABLE 1-continued

| Fluence (mJ/cm²) | Frequency $f_F$ of repetition of the pulses | Intervention |
| --- | --- | --- |
| <10 | 10 Hz | Opening of the heads of the nanotubes of a carpet of nanotubes |

The device of the invention advantageously enables the energy deposited by pulse fire and by unit of area to be controlled.

To this end the main adjustment parameters are:
the energy of a pulse,
the repetition frequency of the pulses, and
the sliding speed of the composite during a cutting operation, which leads to a rate of spatial overlap of the successive pulses.

Figure 10:
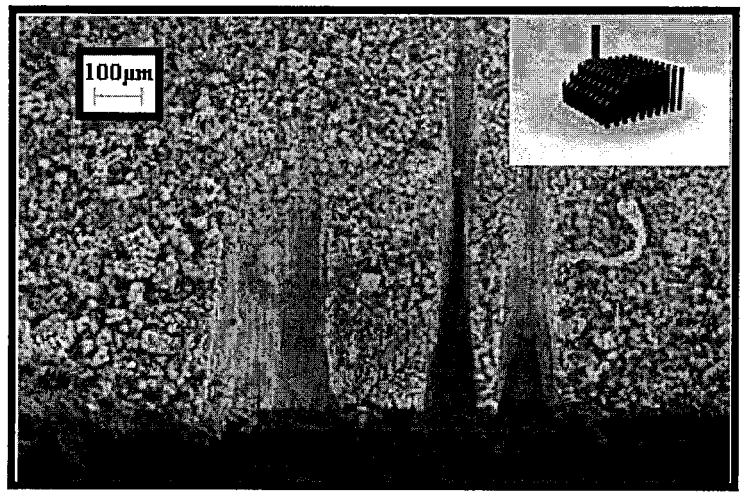
FIGS. 10 and 11 represent, as examples, photographs of cutting results obtained by the method of the invention.
Figure 11:
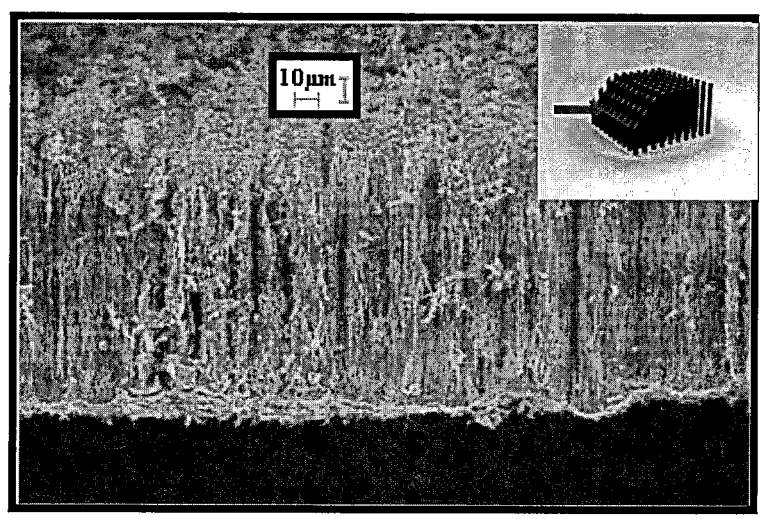

FIGS. 10 and 11 represent photographs of cutting results obtained by the method of the invention. In this case the carpet of nanotubes is machined on the bias. FIG. 10 represents a top view of the carpet of nanotubes and FIG. 11 represents a side view of the carpet of nanotubes. These photographs show clearly the accuracy and cleanness of the cut according to the method of the invention.

The invention claimed is:

1. A device for cutting a structure including wire-like nanoscale objects roughly aligned in a same axis, comprising:
   a laser source configured to emit a laser beam in a form of laser pulses of a width of between 1 femtosecond and 300 femtoseconds;
   means to adjust energy of each laser pulse emitted to between 0.1 µJ and 10 mJ;
   means to set a repetition frequency of the emitted laser pulses to between 10 Hz and 10 kHz;
   means to polarize the emitted laser pulses linearly such that a laser pulse includes a first component in the axis of the nanoscale objects and/or of a second component in an axis perpendicular to the axis of the nanoscale objects;
   means to focus, on the structure, the linearly polarized laser pulses over a distance of centimeters, wherein a focal spot of the beam of laser pulses is between 10 µm and 500 µm, and
   a containment enclosure including:
   a) an observation port transparent to the wavelength of the laser pulses,
   b) a bracket on which the structure to be cut is positioned,
   c) means to move the bracket so as to cause a relative displacement of the laser beam relative to the wire-like nanoscale objects of the structure, and
   d) means to remove from the enclosure debris resulting from a cutting.

2. A device according to claim 1, in which the means to adjust the energy of each laser pulse emitted between 0.1 µJ and 10 mJ includes a half-wave lens and a polarizer, and the means to set a frequency of repetition of the laser pulses emitted between 10 Hz and 10 kHz includes a Pockels cell.

3. A device according to claim 1, in which the means to remove, out of the enclosure, the debris resulting from the cutting includes a pressurized gas inlet positioned close to the structure, and means to evacuate the gas to convey the debris resulting from the cutting outside of the enclosure.

4. A device according to claim 1, in which the means to focus the linearly polarized laser pulses includes at least one lens of conical type or at least one axicon that focuses the laser pulses in a form of a linear beam having an axis roughly perpendicular to the axis of the wire-like nanoscale objects.

5. A device according to claim 1, in which the means to focus the linearly polarized laser pulses includes a lens of cylindrical type that focuses the laser pulses in a form of a laser sheet that defines a plane roughly perpendicular to the axis of the wire-like nanoscale objects.

6. A method for cutting a structure including wire-like nanoscale objects using a device according to claim 1, in which:
   a) the linearly polarized laser pulses focused on the structure have a propagation direction roughly perpendicular to a flat surface that defines a thickness of the structure, and
   b) the structure is moved in a direction parallel to the flat surface and perpendicular to the propagation direction of the pulses.

7. A method according to claim 6, in which the linearly polarized laser pulses are focused in a form of a laser sheet on a thickness of the structure, wherein the laser sheet defines a plane roughly perpendicular to a plane defined by the thickness of the structure, and the direction in which the structure is moved is roughly perpendicular to the plane defined by the thickness of the structure.

8. A method according to claim 6, in which the structure includes a carpet of wire-like nanoscale objects bonded to a substrate, wherein a cutting operation includes delaminating the carpet of wire-like nanoscale objects from the substrate.

9. A method according to claim 6, in which the structure includes a carpet of wire-like nanoscale objects, and wherein a cutting operation includes thinning the carpet of wire-like nanoscale objects.

10. A method according to claim 6, in which the structure includes a carpet of wire-like nanoscale objects having heads or ends, and wherein a cutting operation includes cutting the heads or ends of the wire-like nanoscale objects.

11. A method according to claim 6, in which the wire-like nanoscale objects are inorganic nanotubes, or chosen from the group constituted by imogolite nanotubes, boron nitride nanotubes (BN), zinc oxide nanotubes (ZnO), gallium nitride nanotubes (GaN), silicon nitride nanotubes (Si3N4), tungsten disulfide nanotubes (WS2), molybdenum disulfide nanotubes (MoS2), tungsten selenide nanotubes (WSe2), molybdenum selenide nanotubes (MoSe2), titanium dioxide nanotubes (TiO2) or molybdenum trioxide nanotubes (MoO3), or one of their blends.

12. A method according to claim 6, in which the wire-like nanoscale objects are organic nanotubes, or chosen from the group constituted by carbon nanotubes, peptide nanotubes, cyclic peptide nanotubes, transmembrane molecule nanotubes, crown ether nanotubes, porphyrin nanotubes, aquaporin nanotubes, gramicidin nanotubes, polymer nanotubes, nanotubes formed by self-assembly of organic molecules, or one of their blends.

13. A method according to claim 6, in which the wire-like nanoscale objects are nanowires, or chosen from the group constituted by gold (Au) nanowires, silver (Ag) nanowires, nickel (Ni) nanowires, platinum (Pt) nanowires, silicon (Si) nanowires, gallium nitride (GaN) nanowires, indium phosphide (InP) nanowires, silicon dioxide (SiO2) nanowires, titanium dioxide (TiO2) nanowires, zinc oxide (ZnO) nanowires, 1,5-diaminoanthraquinone nanowires, DNA (DeoxyriboNucleic Acid) nanowires, nanowires consisting of nanotubes, or one of their blends.

\* \* \* \* \*